United States Patent
Inamura et al.

(10) Patent No.: US 9,387,795 B2
(45) Date of Patent: Jul. 12, 2016

(54) HEADLAMP DEVICE FOR AUTOMOBILE

(71) Applicant: Mitsubishi Jidosha Kogyo Kabushiki Kaisha, Tokyo (JP)

(72) Inventors: Toshiki Inamura, Tokyo (JP); Takanobu Toritani, Tokyo (JP); Katsuhiko Takashina, Tokyo (JP); Tadashi Yasui, Tokyo (JP); Yasushi Saeki, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 155 days.

(21) Appl. No.: 14/348,164

(22) PCT Filed: Oct. 2, 2012

(86) PCT No.: PCT/JP2012/075558
§ 371 (c)(1),
(2) Date: Mar. 28, 2014

(87) PCT Pub. No.: WO2013/051581
PCT Pub. Date: Apr. 11, 2013

(65) Prior Publication Data
US 2014/0233255 A1 Aug. 21, 2014

(30) Foreign Application Priority Data
Oct. 4, 2011 (JP) .................................. 2011-220457

(51) Int. Cl.
*B60Q 1/00* (2006.01)
*B60Q 1/04* (2006.01)
*B60R 21/34* (2011.01)

(52) U.S. Cl.
CPC ............. *B60Q 1/0491* (2013.01); *B60R 21/34* (2013.01); *B60R 2021/343* (2013.01)

(58) Field of Classification Search
CPC .... B60Q 1/0491; B60Q 1/0483; B60R 21/31; B60R 2021/343
USPC ........................................................... 362/549
See application file for complete search history.

(56) References Cited

U.S. PATENT DOCUMENTS

| 6,478,456 B1 * | 11/2002 | Eichhorn | B60Q 1/0416 362/369 |
| 7,404,688 B2 * | 7/2008 | Schwab | B60Q 1/0491 362/505 |
| 2007/0120420 A1 * | 5/2007 | Andre | B60Q 1/0491 307/9.1 |

FOREIGN PATENT DOCUMENTS

| FR | 2852275 | * | 3/2003 | ............. B60R 21/34 |
| JP | 2004-203288 A | | 7/2004 | |

(Continued)

OTHER PUBLICATIONS

English Translation of FR 2852275, Marechal et al, Mar. 2003.*

*Primary Examiner* — Peggy Neils
(74) *Attorney, Agent, or Firm* — Birch, Stewart, Kolasch & Birch, LLP

(57) ABSTRACT

A headlamp device of a vehicle is configured as follows: A headlamp housing 30 is provided with a shock-absorbing portion 33 which protrudes from the rear wall of the headlamp housing 30 toward the rear of the vehicle, and whose longitudinal section is formed in a U-shape which opens toward the front of the vehicle. The shock-absorbing portion 33 is provided with a lamp mounting foot which protrudes from a posterior wall 33c of the shock-absorbing portion 33 toward the rear of the vehicle, and which has a leading end attached to a vehicle body 2.

8 Claims, 4 Drawing Sheets

(56) References Cited

FOREIGN PATENT DOCUMENTS

| JP | 2004-207061 A | 7/2004 | | |
| JP | 2007-145149 A | 6/2007 | | |
| WO | WO2007/022952 | * | 3/2007 | ............... B60Q 1/04 |

* cited by examiner

HEADLAMP DEVICE FOR AUTOMOBILE

TECHNICAL FIELD

This invention relates to a headlamp device provided in an automobile. More specifically, the invention relates to a structure for mitigating an impact which a pedestrian or the like receives when the pedestrian or the like collides with an automobile which is running.

BACKGROUND ART

It has been customary for a front hood constituting the front of an automobile, when colliding with the head of a pedestrian, to deform to some extent and absorb impact load, thereby suppressing damage to the head of the pedestrian. In recent years, the Technical Standards for the Protection of Heads of Pedestrians, which define the impact reducing performance of the front hood, have been introduced. The front hood is required to fulfill these Standards. That is, it is required that the HIC (Head Injury Criteria) value of the front hood within a predetermined evaluation area be a predetermined value or lower.

In accordance with recent changes in the designing of automobiles, headlamp devices are showing a tendency to be upsized, and those having a surface shape continuous with the front hood are on the increase. That is, the surface of the headlamp device together with the front hood have substantially constituted the upper surface of the front of the automobile. Some of the headlamps, therefore, have needed to satisfy the Technical Standards for the Protection of Heads of Pedestrians as do the front hoods.

On the other hand, proposals have been made, for example, for a headlamp device composed of a headlamp housing having a shock-absorbing portion which has a sectional shape opening toward the rear of a vehicle, and which has a plurality of ribs provided inside (see Patent Document 1).

By structuring the headlamp device as above, an impact force exerted in a collision of an automobile with a pedestrian or the like is absorbed by the deformation of the shock-absorbing portion, and the impact force acting on the pedestrian can be mitigated.

PRIOR ART DOCUMENTS

Patent Documents

Patent Document 1: JP-A-2004-207061

SUMMARY OF THE INVENTION

Problems to be Solved by the Invention

In recent years, there has been an intense demand for multifunctional headlamp devices, and their weights have tended to increase. Thus, a mounting portion for mounting the headlamp device (headlamp housing) on a vehicle body should preferably secure high rigidity. A shock-absorbing portion absorbing impact force by its deformation, on the other hand, should preferably have relatively low rigidity. As noted here, the rigidity required for the mounting portion and the rigidity required for the shock-absorbing portion are in a mutually contradictory relationship. With a structure in which the mounting portion is provided on the shock-absorbing portion as in Patent Document 1, it is difficult to set appropriate rigidity which satisfies both requirements. In detail, Patent Document 1 installs the ribs inside the shock-absorbing portion in order to ensure the rigidity of the mounting portion. If the rigidity of the ribs is too high, the ribs themselves are likely to inhibit the deformation of the shock-absorbing portion. If the rigidity of the ribs is too low, by contrast, the rigidity of the mounting portion cannot be ensured. Thus, balanced rigidity is difficult to achieve. Providing the ribs would also complicate the structure, entailing increased costs.

Various structures are available for the headlamp devices. It has been difficult to adopt the structure of the headlamp described in Patent Document 1 for all the headlamps, and such a structure has left room for improvement.

The present invention has been accomplished in the light of the above-mentioned circumstances. It is an object of the present invention to provide a headlamp device which can effectively mitigate impact force exerted on a pedestrian or the like in a collision, while ensuring ample rigidity of a mounting portion, by a simple structure at a reduced cost.

Means for Solving the Problems

A first aspect of the present invention, intended to solve the above problems, is a headlamp device of a vehicle, the headlamp device being equipped with a headlamp housing to which a lamp light-emitting portion including a bulb is fixed, wherein the headlamp housing is provided with a shock-absorbing portion which protrudes from a rear wall of the headlamp housing toward the rear of the vehicle, and whose longitudinal section is formed in a U-shape which opens toward the front of the vehicle, and the shock-absorbing portion is provided with a lamp mounting foot which protrudes from a posterior wall of the shock-absorbing portion toward the rear of the vehicle, and which has a leading end attached to a vehicle body.

A second aspect of the present invention is the headlamp device according to the first aspect wherein the shock-absorbing portion is provided above the lamp light-emitting portion.

A third aspect of the present invention is the headlamp device according to the first or second aspect wherein the shock-absorbing portion extends in a vehicle width direction in such a manner as to include a top wall and a bottom wall opposed to each other, and a posterior wall connecting the top wall and the bottom wall together, and has in an end region thereof in the vehicle width direction a gradually-diminishing section in which a front-to-rear width of the top wall gradually diminishes toward the front of the vehicle and a height of the posterior wall gradually diminishes toward a lower side of the vehicle, and a boundary region between the posterior wall and the top wall constituting the gradually-diminishing section is formed from a curved surface.

A fourth aspect of the present invention is the headlamp device according to any one of the first to third aspects wherein the shock-absorbing portion and the lamp mounting foot are integrally formed of the same resin material.

A fifth aspect of the present invention is the headlamp device according to any one of the first to fourth aspects wherein the lamp mounting foot is disposed outwardly in the vehicle width direction of the headlamp housing to serve as a reference for mounting on the vehicle body.

Effects of the Invention

With the headlamp device of the present invention configured as above, the rigidity of the shock-absorbing portion can be kept relatively low, with the rigidity of the lamp mounting foot provided in correspondence with the shock-absorbing portion being sufficiently ensured. Thus, the headlamp device can be firmly fixed to the vehicle body, and impact force exerted on a pedestrian or the like in a collision can be effectively mitigated by the deformation of the shock-absorbing portion. Moreover, the shock-absorbing portion is formed in a simple configuration in which a part of the rear wall of the headlamp housing has a longitudinal section formed in a U-shape. Thus, costs can be reduced.

MODE FOR CARRYING OUT THE INVENTION

An embodiment of the present invention will be described in detail hereinbelow by reference to the accompanying drawings.

Figure 1:
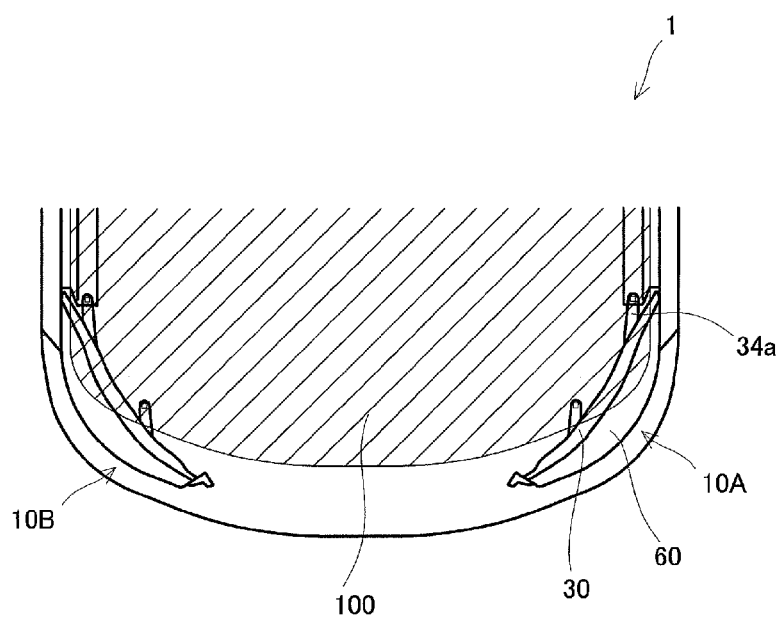
FIG. 1 is a schematic view showing the front structure of a vehicle equipped with a headlamp device according to an embodiment of the present invention.

As shown in FIG. 1, a vehicle 1 such as an automobile has headlamp devices 10 (10A, 10B) mounted on both of right and left sides in the vehicle width direction of the front of the vehicle body of the vehicle. The headlamp device 10 according to the present embodiment is of a relatively large size, and its part is located within a pedestrian protection area 100 indicated by oblique lines in the drawing. The pedestrian protection area 100 refers to an area which is an object to be evaluated by the Pedestrian Head Protection Performance Tests.

With the present invention, the standards of the Pedestrian Head Protection Performance Tests have to be fulfilled for the part of the headlamp device 10 located in the pedestrian protection area 100. According to the present embodiment, the headlamp device 10 is structured as will be described below, whereby the HIC value within the pedestrian protection area 100 is set at the reference value or less.

Figure 2:
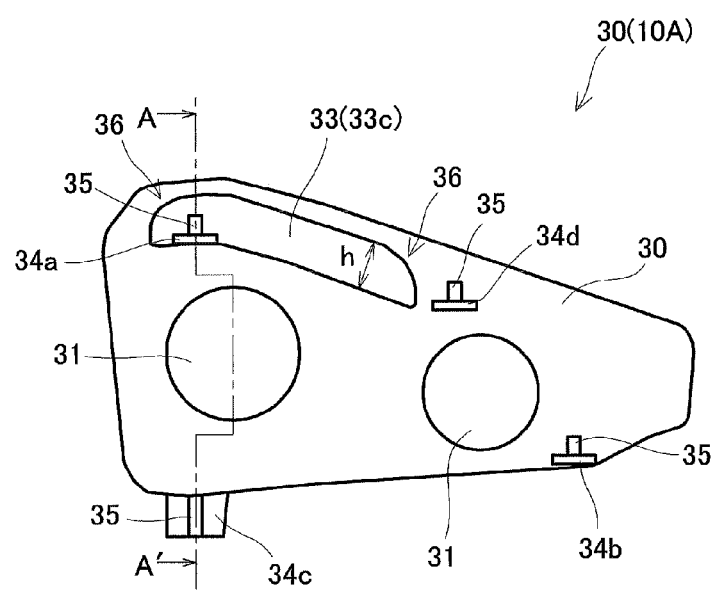
FIG. 2 is a view of a headlamp housing, when viewed from a rear surface, according to the embodiment of the present invention.
Figure 3:
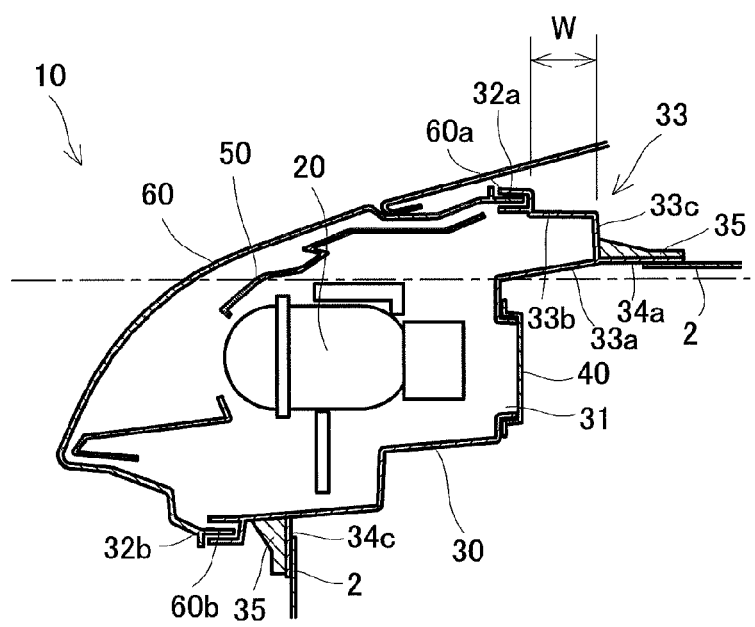
FIG. 3 is a sectional view of the headlamp device according to the embodiment of the present invention, taken on line A-A' in FIG. 2.

The headlamp device 10 is equipped with a headlamp housing 30 made of resin which constitutes the outer frame of the headlamp device 10; a lamp light-emitting portion 20 provided within the headlamp housing 30 and including a bulb, a reflection plate or the like as a light source; and an outer lens 60 provided on the front surface of the headlamp housing 30 and allowing light from the light source to pass therethrough, as shown in FIGS. 1 to 3. The lamp light-emitting portion 20 is fixed to the headlamp housing 30 by a bracket or the like. In the present embodiment, the headlamp device 10 is provided with two of the lamp light-emitting portions 20, one for low beam and the other for high beam. These two lamp light-emitting portions 20 are arranged parallel in the vehicle width direction and fixed within the headlamp housing 30. Since the lamp light-emitting portion 20 may adopt a publicly known structure, its detailed explanation is omitted herein.

The headlamp housing 30 is provided with an opening 31 for replacing the bulb, in correspondence with each lamp light-emitting portion 20. Each opening 31 is closed with a cover member 40, for example, a rubber cap or the like.

The headlamp device 10 is also equipped with an aiming mechanism (optical axis adjusting mechanism) for adjusting the optical axis, although this is not illustrated. The aiming mechanisms are provided in correspondence with the two lamp light-emitting portions 20, respectively, and can individually perform optical axis adjustment. The aiming mechanism is configured to be capable of adjusting the direction of the reflection plate so as to be upward/downward or rightward/leftward, for example, by driving of an actuator. The aiming mechanism adjusts the optical axis while being loaded on the automobile.

To the headlamp housing 30, an extension 50 and the outer lens 60 are further fixed forwardly of the lamp light-emitting portion 20. The extension 50 is disposed in such a manner as to close the gap between the lamp light-emitting portion 20 and the headlamp housing 30. The transparent outer lens 60 with excellent light perviousness is disposed outwardly of the extension 50, and its outer circumferential edge is held by the headlamp housing 30.

Concretely, the headlamp housing 30 is provided with engaging grooves 32 with which the outer circumferential edge of the outer lens 60 is engaged. For example, in the section taken on the line A-A' shown in FIG. 3, the headlamp housing 30 has the engaging groove 32a at its upper leading end, and has the engaging groove 32b at its lower leading end. The upper leading end 60a of the outer lens 60 is engaged with the engaging groove 32a of the headlamp housing 30, while the lower leading end 60b of the outer lens 60 is engaged with the engaging groove 32b of the headlamp housing 30, whereby the outer lens 60 is supported by and fixed to the headlamp housing 30.

On the posterior wall surface of the headlamp housing 30, a shock-absorbing portion 33 is provided above the lamp light-emitting portion 20 (i.e., above a dashed dotted line in FIG. 3). The shock-absorbing portion 33 is formed in nearly a U-shape, which opens toward the front of the vehicle, and is deformed when colliding with a pedestrian or the like, thereby absorbing impact force in the collision. The shock-absorbing portion 33 is formed such that its part, namely, a part of the posterior wall surface of the headlamp housing 30, protrudes toward the rear of the vehicle. Concretely, the shock-absorbing portion 33 is constituted in nearly a U-shape by a bottom wall 33a and a top wall 33b opposed to each other, and a posterior wall 33c connecting the bottom wall 33a and the top wall 33b together.

The aforementioned engaging groove 32a, with which the upper leading end 60a of the outer lens 60 is engaged, is provided at the leading end of the top wall 33b of the shock-absorbing portion 33.

The shock-absorbing portion 33 is formed with a predetermined length along the exterior shape of the upper edge of the headlamp housing 30 (see FIG. 2). In this manner, the shock-absorbing portion 33 is present in the part of the headlamp housing 30 located at least within the pedestrian protection area 100.

The headlamp housing 30 is provided with a plurality of (four in the present embodiment) lamp mounting feet 34a to 34d, and is mounted on a vehicle body (a skeletal member such as a frame) 2 at the leading ends of the lamp mounting feet 34a to 34d, as shown in FIGS. 2 and 3.

The upper and lower lamp mounting feet 34a and 34c located outwardly in the vehicle width direction of the headlamp housing 30, and the lamp mounting foot 34b located most inwardly in the vehicle width direction have higher rigidity than the lamp mounting foot 34d. Basically, the lamp mounting feet 34a, 34b and 34c at these three locations are adapted to support the headlamp device 10. The lamp mounting feet 34a, 34c are fixed to an upper frame of the vehicle body 2 (or a fender panel mounted on the upper frame) to serve as an overall reference for the mounting of the headlamp device 10. On the other hand, the lamp mounting foot 34b is finely adjustable in the horizontal direction, with the lamp mounting foot 34a as a reference, and is fixed to a radiator support or the like of the vehicle body 2.

The lamp mounting foot 34d is provided to restrain the headlamp device 10 from toppling forwards or backwards.

As shown in FIG. 2, a rear view of the headlamp housing 30, the lamp mounting foot 34a is provided at a part opposing the shock-absorbing portion 33. The lamp mounting foot 34a is provided to protrude from the posterior wall 33c of the shock-absorbing portion 33 toward the rear of the vehicle, as shown in FIG. 3. That is, the shock-absorbing portion 33 is formed at the root of the lamp mounting foot 34a which is disposed in an upper part of the headlamp housing 30 to act as the mounting reference for the headlamp device 10. The shock-absorbing portion 33 is protruded from the rear wall of the headlamp housing 30 toward the rear of the vehicle, and constitutes a part of the lamp mounting foot 34a. That is, the rearward protrusion of the shock-absorbing portion 33 presents a configuration in which the length of the lamp mounting foot 34a is shortened to make the rigidity the lamp mounting foot 34a minimally decrease. By this feature, shock from above can be efficiently absorbed by the shock-absorbing portion 33, with the rigidity of the lamp mounting foot 34a being maintained. A reinforcing rib 35 continuous with the posterior wall 33c of the shock-absorbing portion 33 is erected on the lamp mounting foot 34a to enhance the rigidity of the lamp mounting foot 34a, but the size of the reinforcing rib 35 is restricted in accordance with the provision of the shock-absorbing portion 33.

As noted above, the shock-absorbing portion 33 of a nearly U-shaped section is formed at the root of the lamp mounting foot 34a. Thus, there can be provided a configuration which enables deformation to occur easily in response to impact from above, while sufficiently ensuring the rigidity of the lamp mounting foot 34a serving as the mounting reference for the headlamp device 10. That is, even if a pedestrian or the like collides with a region near the lamp mounting foot 34a having relatively high rigidity, the shock-absorbing portion 33 would deform and could limit the impact to a low value.

Hence, the headlamp housing 30 can be firmly mounted on the vehicle body 2 via the lamp mounting feet 34a to 34d. In other words, the headlamp device 10 can be firmly mounted on the vehicle body 2. On the other hand, the rigidity of the shock-absorbing portion 33 is kept relatively low. Thus, impact force which a pedestrian or the like undergoes in a collision can be effectively relieved by the shock-absorbing portion 33.

Figure 4:
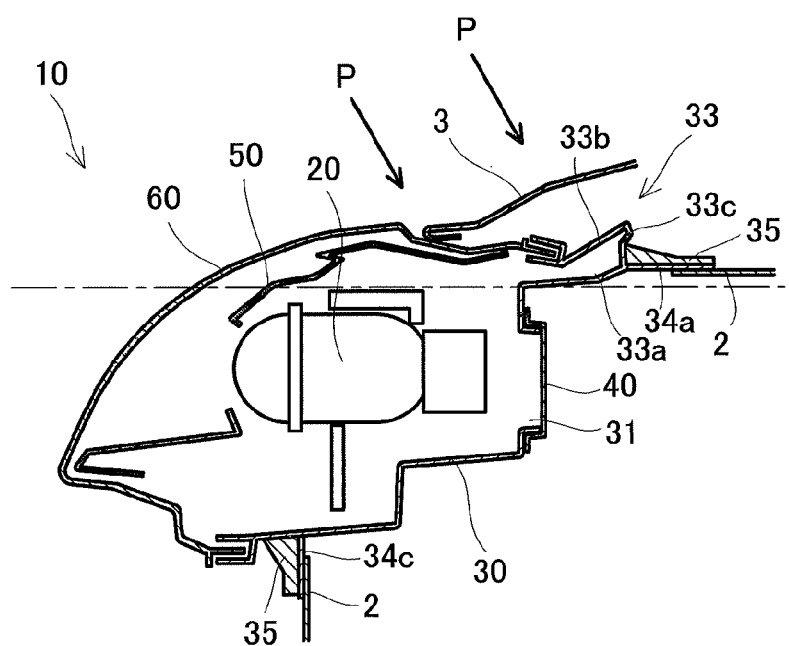
FIG. 4 is a sectional view showing the deformed state of the headlamp device according to the embodiment of the present invention.

When the vehicle when running collides with a pedestrian or the like, for example, and in response, the pedestrian or the like hits the headlamp device 10 almost directly from above, as indicated by arrows P in FIG. 4. At this time, the outer lens 60 deforms downward along with a front hood 3 constituting the vehicle body 2. In association with this deformation, the shock-absorbing portion 33 with relatively low rigidity in the headlamp housing 30 deforms downward (buckles). Thus, the energy of the collision is efficiently absorbed. Consequently, impact which the pedestrian or the like receives from the headlamp device 10 can be lessened reliably and easily, so that the pedestrian or the like can be protected effectively.

As mentioned earlier, the shock-absorbing portion 33 is provided above a structure such as the lamp light-emitting portion 20. When the pedestrian or the like collides with the headlamp device 10, therefore, a space is sufficiently ensured in which the outer lens 60 or the shock-absorbing portion 33 is deformable In the present embodiment, moreover, the end region of the shock-absorbing portion 33 is configured as a gradually-diminishing section 36 in which the height h of the posterior wall 33c gradually diminishes toward the lower side of the vehicle, and the front-to-rear width W of the top wall 33b (see FIG. 3) gradually diminishes toward the front of the vehicle, as shown in FIG. 2. Furthermore, the boundary region between the top wall 33b and the posterior wall 33c constituting the gradually-diminishing section 36 is formed from a curved surface. In other words, a ridge-line part formed by the top wall 33b and the posterior wall 33c is gradually changed in diameter. By this measure, the rigidity of the end region of the shock-absorbing portion 33 is also kept to relatively low rigidity as is the rigidity of the central region. Thus, energy due to collision is absorbed more efficiently by the shock-absorbing portion 33, and the pedestrian or the like can be protected effectively.

The shock-absorbing portion 33 and the lamp mounting foot 34a each constitute a part of the headlamp housing 30, and both of them are integrally formed of the same resin material. Furthermore, the shock-absorbing portion 33 is in a simple configuration in which the shape of a part of the posterior wall 33c of the headlamp housing 30 is of a nearly U-shaped section protruding rearward. According to the constitution of the present invention, as described above, the shock-absorbing portion 33 and the lamp mounting foot 34a can be provided with the desired rigidity by a simple configuration, without any change in the type of the resin material. Hence, the headlamp housing 30 can be produced relatively easily and at a low cost by molding.

With the present invention, moreover, the rigidity of the lamp mounting foot 34a and the rigidity of the shock-absorbing portion 33 can be adjusted relatively easily. Thus, the distance from the engaging groove 32a to the point where the lamp mounting foot 34a and the vehicle body 2 are fixed together can be further lengthened. Hence, the present invention can be applied to headlamp devices of various structures.

The embodiment of the present invention has been described above, but it goes without saying that the present invention is not limited to this embodiment. The present invention may be changed or modified, as appropriate, without departing from the gist thereof.

EXPLANATIONS OF LETTERS OR NUMERALS

1 Vehicle
2 Vehicle body
3 Front hood
10 Headlamp device
20 Lamp light-emitting portion
30 Headlamp housing
31 Opening
32 Engaging groove
33 Shock-absorbing portion
33a Bottom wall
33b Top wall
33c Posterior wall
34 Lamp mounting foot
35 Reinforcing rib
36 Gradually-diminishing section
40 Cover member
50 Extension
60 Outer lens
100 Pedestrian protection area

The invention claimed is:

1. A headlamp device of a vehicle, equipped with a headlamp housing to which a lamp light-emitting portion including a bulb is fixed, wherein
the headlamp housing is provided with a shock-absorbing portion which protrudes from a rear wall of the headlamp housing toward a rear of the vehicle, and whose longitudinal section is formed in a U-shape which opens toward a front of the vehicle,
the shock-absorbing portion is provided with a lamp mounting foot which protrudes from a posterior wall of the shock-absorbing portion toward the rear of the vehicle, and which has a leading end attached to a vehicle body,
the shock-absorbing portion extends in a vehicle width direction in such a manner as to include a top wall and a bottom wall opposed to each other, and a posterior wall connecting the top wall and the bottom wall together, and has in an end region thereof in the vehicle width direction a gradually-diminishing section in which a front-to-rear width of the top wall gradually diminishes toward the front of the vehicle and a height of the posterior wall gradually diminishes toward a lower side of the vehicle, and
a boundary region between the posterior wall and the top wall constituting the gradually-diminishing section is formed from a curved surface.

2. The headlamp device according to claim 1, wherein the shock-absorbing portion is provided above the lamp light-emitting portion.

3. The headlamp device according to claim 1, wherein the shock-absorbing portion and the lamp mounting foot are integrally formed of an identical resin material.

4. The headlamp device according to claim 2, wherein the shock-absorbing portion and the lamp mounting foot are integrally formed of an identical resin material.

5. The headlamp device according to claim 1, wherein the lamp mounting foot is disposed outwardly in a vehicle width direction of the headlamp housing to serve as a reference for mounting on the vehicle body.

6. The headlamp device according to claim 2, wherein the lamp mounting foot is disposed outwardly in a vehicle width direction of the headlamp housing to serve as a reference for mounting on the vehicle body.

7. The headlamp device according to claim 3, wherein the lamp mounting foot is disposed outwardly in a vehicle width direction of the headlamp housing to serve as a reference for mounting on the vehicle body.

8. The headlamp device according to claim 4, wherein the lamp mounting foot is disposed outwardly in a vehicle width direction of the headlamp housing to serve as a reference for mounting on the vehicle body.

* * * * *